United States Patent [19]

Jennings, Jr.

[11] 4,114,95(
[45] Sep. 19, 197{

[54] TRANSPORTING IRON ORE SLURRIES

[75] Inventor: Harley Y. Jennings, Jr., Fullerton, Calif.

[73] Assignee: Chevron Research Company, San Francisco, Calif.

[21] Appl. No.: 655,355

[22] Filed: Feb. 5, 1976

Related U.S. Application Data

[63] Continuation of Ser. No. 282,622, Aug. 21, 1972, abandoned, which is a continuation-in-part of Ser. No. 51,383, Jun. 30, 1970, abandoned.

[51] Int. Cl.$^2$ .............................................. B65G 53/04
[52] U.S. Cl. ........................................ 302/66; 137/13; 252/62.53; 252/62.54; 252/313 R; 252/363.5
[58] Field of Search ............... 302/14, 66; 252/313 R, 252/363.5, 62.53, 62.54; 137/13

[56] References Cited

U.S. PATENT DOCUMENTS

| 3,102,548 | 9/1963 | Smith et al. | 137/1 |
| 3,230,919 | 1/1966 | Crawford | 137/13 |
| 3,405,976 | 10/1968 | Anderson et al. | 302/1 |
| 3,432,209 | 3/1969 | Scott | 302/14 |
| 3,472,769 | 10/1969 | Lummus et al. | 137/13 |

FOREIGN PATENT DOCUMENTS 26,301   2/1969   Australia ........................................ 44/5

Primary Examiner—Richard D. Lovering
Attorney, Agent, or Firm—Jr. Ralph L. Freeland; Edward J. Keeling

[57] ABSTRACT

Method of transporting iron ore by forming an aqueou slurry containing by volume 20 to 45 percent iron or( from 0.02 to 0.4 percent by weight based on iron ore i the slurry of a dispersant; and from 0.01 to 0.2 percen by weight based on water in the slurry of an organi polymer and moving the slurry through a pipeline.

8 Claims, No Drawings

TRANSPORTING IRON ORE SLURRIES

This application is a continuation of application Ser. No. 282,622, filed Aug. 21, 1972 and now abandoned, which application is a continuation-in-part of application Ser. No. 51,383 for HEMATITE SLURRY PIPELINING, filed June 30, 1970, and now abandoned.

BACKGROUND OF THE INVENTION

The present invention is concerned with the transportation of iron ore by pipeline. More particularly, the invention is concerned with the formation and pumping of aqueous slurries of iron ore containing additives to improve the viscosity characteristics of the slurries and to increase the carrying capacity of the slurry. In its more specific aspects, the invention is concerned with forming a pumpable aqueous slurry containing a range of particle sizes of iron ore, a dispersant such as lignosulfonate and an organic polymer.

Heretofore, many methods of pipelining aqueous slurries of granular material have been described and attempted. Many problems have been associated with pipelining granular material especially in the more dense materials such as iron ore and, in particular, hematite and magnetite. The world's first long distance iron ore slurry pipeline was put into service by Savage River Mines, Tasmania, Australia, on Oct. 26, 1967. Operation of this pipeline has been a technical success moving 2.2 million tons per year of iron ore a distance of 53 miles. The process used heretofore in pipelining iron ore comprised forming an aqueous slurry with finely ground iron ore without the use of additives. Thus, in operations heretofore, the iron ore has been ground so that it will pass a 325 mesh screen. In laboratory studies, it has been found that minus 325 mesh hematite will not flow in untreated slurries containing more than 28 percent hematite by volume. Thus the volumetric capacity of finely ground iron ore in slurry transportation methods is limited. In addition, it is very expensive to provide 100 percent finely ground ore. There has been no satisfactory solution as yet proposed which permits maximum pipeline transportation of a mix of sizes of iron ore particles which allows maximum volume transportation while preventing undesirable drop-out in the pipeline of the larger particles.

SUMMARY OF THE INVENTION

The present invention provides a method for pipelining iron ore by forming an aqueous slurry containing by volume from 20 to 45 percent iron ore and from 0.02 to 0.4 percent by weight based on iron ore content of a dispersant and from 0.01 to 0.2 percent by weight based on water content of an organic polymer. The dispersant in this amount acts to reduce the viscosity of the slurry which may otherwise become undesirably high due to the presence of very finely ground iron ore. The action of the dispersant is largely electro-kinetic in nature. The dispersant adsorbs on the iron particles imparting negative charges that cause them to repel one another. Thus the dispersants are ionic in nature. When the viscosity is so reduced, it has been found that larger amounts of such finely ground iron ore, i.e., minus 325 mesh may be pipelined. However, it has also been found that drop-out will also occur. This is especially a problem when a gradient of particle size is present, i.e., from minus 10 mesh through minus 325 mesh. Thus unless an organic polymer is added to the slurry, the larger particles will tend to drop out of the slurry. In accordance with the invention, from 0.01 to 0.2 weight percent based on water content of an organic polymer is added to the slurry to increase the carrying capacity of the flowing slurry to allow a reasonable percentage of larger iron ore particles to be carried in the slurry.

In accordance with the preferred form of the invention, an aqueous slurry of hematite particles of from 20 to 45 percent by volume is formed. In the preferred form, all of the hematite particles will pass a 10 mesh screen, 95 percent of the particles will pass a 65 mesh screen, 80 percent of the particles will pass a 200 mesh screen and 70 percent of the particles will pass a 325 mesh screen. Thus in accordance with the present invention, a variety of particle sizes of hematite can be handled, and expensive fine grinding of 100 percent of the particles is avoided. A dispersant such as lignosulfonate in an amount of from 0.02 to 0.4 percent by weight based on iron ore content is added to the slurry to reduce its viscosity and from 0.01 to 0.2 percent by volume of an organic polymer, preferably a high molecular weight water-soluble polyacrylamide (PAM), are added to the slurry to increase its carrying capacity and to prevent drop-out of the coarser particles as the slurry moves through the pipeline.

OBJECTS OF THE INVENTION

The principal object of the present invention is to provide a method of pipelining iron ore which method permits transporting a range of particle sizes in the slurry through the use of additives. Further objects and advantages of the present invention will become apparent from the following detailed description.

DETAILED DESCRIPTION OF PREFERRED EMBODIMENT

The present invention provides for transporting iron ore such as hematite in slurry form through a pipeline. Hematite or ferric oxide, $Fe_1O_3$, as evidenced by its abundance as a naturally occurring ore is a very stable compound practically insoluble in water. An average hematite ore might, for example, contain from 85 to 93 percent ferric oxide with an average iron content of 62.5 percent and a density of 4.76 gm/ml. The hematite ore is ground by various means to make it suitable for slurry pipelining. Heretofore all, or nearly all, of the hematite had to be very finely ground to be suitable for slurry pipelining. The present invention dispenses with the need for 100 percent fine grinding of the hematite since a reasonable percentage of larger sized particles may be carried with the slurry of the present invention.

In accordance with the invention, an aqueous slurry of hematite of from 20 to 45 percent by volume is formed. The slurry contains 0.02 to 0.4 percent by weight based on hematite content of the slurry of a dispersant and from 0.01 to 0.2 percent by weight based on water content of the slurry of an organic polymer. Preferably, the dispersant and the organic polymer are added to the water prior to the addition of the hematite. In this manner, a complete mix is assured and early drop-out or undesired high viscosity in the slurry is avoided. A slurry is pumped through a pipeline to a desired downline location where it is removed from the pipeline and the water with the water-soluble additives drained off the hematite. The hematite is then recovered in cake form and is then waiting for further treatment.

Dispersants useful in the present invention include lignitic materials; tannins (Quebracho); various polyphosphates such as sodium hexametaphosphate and sodium tetraphosphate; and carboxymethyl cellulose. A selected dispersant is added to the slurry in an amount of from 0.02 percent to 0.4 percent.

The preferred viscosity-reducing agents are the lignitic materials and particularly the lignosulfonates. The lignosulfonates are by-products of the wood sulfite pulping industry. They are water-soluble, anionic, surface-active derivatives of lignin with molecular weights varying between 1,000 and 20,000. The organic structure has not been completely determined but it is known that the basic monomer unit is a phenylpropane which is substituted with hydrophilic groups, mainly hydroxyls. The preferred material is a brown powder completely soluble in water but insoluble in oils and in most organic solvents.

It has been found that 0.02 to 0.4 percent by weight of lignosulfonate based on iron ore content of the slurry is effective in reducing the viscosity of such a slurry. The most effective range is between about 0.05 percent to 0.2 percent by weight lignosulfonate based on iron ore content of the slurry. It has been found that amounts less than 0.02 percent by weight are not very effective in reducing viscosity. Further, it has been found that increasing the amount of lignosulfonate to above about 0.4 percent by weight based on iron ore content of the slurry does not result in lowering the viscosity but rather tends to increase the viscosity of the slurry. Thus in accordance with the present invention lignosulfonate in an amount between 0.02 to 0.4 percent by weight based on iron ore content is added to the slurry to reduce its viscosity. The action of the lignosulfonate is dispersion. That is, the lignosulfonate disperses the very finely ground particles by imparting a negative charge causing them to repel one another. This prevents an undesirable buildup in viscosity due to agglomeration of the fine particles. As noted, when such dispersion occurs, however, larger sized particles tend to drop-out of the slurry and become deposited at the bottom of the pipe. This obviously is an undesirable and potentially critical failure in a slurry transportation system.

To overcome the drop-out problem an organic polymer is added to the slurry. Generally, the organic polymers useful in the invention include synthetic organic polymers such as water-soluble polyacrylamide and naturally occurring organic polymers such as guar gum. These organic polymers are nonionic. The synthetic organic polymers are used in accordance with the invention in an amount of between 0.01 to 0.05 percent based on water content of the slurry. A larger amount of the naturally occuring organic polymer is required. Thus guar gum is used in accordance with the invention in amounts between 0.05 percent and 0.2 percent based on water content of the slurry. Choice between these organic polymers depends on such factors as price and availability. The preferred organic polymer is a high molecular weight water-soluble polyacrylamide. A particularly preferred organic polymer of this character is a viscosity control additive manufactured by the Dow Chemical Company and known as "Dowell J100". This product is also known as Dow ET-597. This additive is a white water-soluble powder described by the manufacturer as a synthetic "organic polymer" for application primarily as a thickening agent for fresh water. PAM is added to the slurry in an amount of from 0.01 to 0.05 percent to increase the carrying capacity of the slurry. Amounts less than 0.01 percent by weight based on water content of the slurry are not adequate to increase the carrying capacity while amounts greater than 0.05 percent tend to actually increase viscosity.

Various laboratory demonstrations were conducted to demonstrate the effectiveness of the present invention. A number of solutions and slurries were prepared and viscosity measurements were made using a calibrated Fann rotational V-G viscometer to obtain values of apparent viscosity as a function of shear rate. The Fann data were used to screen chemical additives as well as to study the effect of other variables on the rheological properties of the slurries. Flow behavior was observed by placing a flow trough in operation which would permit observation of the behavior of the slurries under actual flowing conditions. A stainless steel trough having straight sides and a rounded bottom equivalent to one-half of a pipe with a two-inch inner diameter was used. The trough was 10 feet long and its inclination could be varied. A high volumetric capacity pump sufficient to generate flow velocities in the trough in excess of 40 gallons per minute or 8 feet per second was used to feed the trough. Experimental procedure was to set the trough inclination to give a desired pressure reading. The flow rate was then adjusted through the infinitely variable drive and pump combination so that the liquid level in the trough was exactly one inch.

Fann viscosity data were obtained for slurries of increasing concentration of hematite ground so that 100 percent would pass through a Tyler 325 mesh screen. The viscosity of the slurry could not be measured with concentrations of solid in excess of 28 percent by volume. The slurries are typical of non-Newtonian fluid; that is, they do not have a constant viscosity at a given temperature and concentration, but instead exhibit a variable viscosity dependent upon the rate of shear. Fann viscometer measurements were made on hematite slurries at four temperatures: 5°, 15°, 25° and 40° C. These data showed that increasing the temperature decreased the apparent viscosity but the effect was small compared to the effect of changing the hematite concentration.

A dispersant, i.e., lignosulfonate, had a marked influence on the apparent viscosity of the 28 percent hematite slurry. Adding higher concentrations of lignosulfonate caused a systematic reduction in the viscosity of the slurry up to concentrations of 0.04 percent. The concentrations of dispersant are based on the weight of solid in the slurry. There was no further reduction in viscosity at higher concentrations of dispersant; in fact at concentrations above 0.40 percent the viscosity began to increase.

The viscosity control additive produced Fann viscosities greater than that of water at all concentrations tested. As the concentration was increased the solutions exhibited non-Newtonian behavior. However, in the flow trough experiments one concentration of additive, 0.03 percent by weight of water, caused the flow rate of water to increase 25 percent from 31.5 to 39.5 gal/min at a trough inclination of 0.10 ft/ft. At higher concentrations the flow rate was slower than that of water.

The lower viscosity caused by adding dispersant to the 28 percent hematite slurry produced an increase in flow rate. The magnitude of the effect is shown by comparing the flow rates at a trough inclination of 0.15 ft//ft. The slurry without dispersant had a flow rate of 3.5 gal./min compared with a rate of 31 gal/min when only 0.05 percent dispersant was added.

The maximum flow rate in the trough tests was set by the pump capacity and the minimum flow rate by the point at which solids would drop-out of the slurry and pile up on the bottom of the trough. In flow tests, using varying concentrations of minus 325 mesh hematite without chemical additive, solids were observed building up on the bottom of the trough. This condition was referred to as drop-out. The drop-out was observed for the 10 percent slurry at rates below 20 gal/min. When the dispersant was added to the 28 percent slurry drop-out was again observed at dispersant concentrations of 0.02 percent at rates below 8 gal/min. The advantage of increased flow achieved by adding dispersant is thus offset to some extent by the increased tendency for solids to drop-out of the slurry. However, addition of the organic polymer overcame the drop-out problem.

Fann viscosity data showed that for a given concentration of hematite a size distribution made up of larger particles produced lower viscosities. This was also borne out in the flow trough tests. The results for a 40 percent hematite slurry composed of 9 percent of plus 200 mesh, 20 percent plus 325 mesh show a flow rate of 14 gal/min at an inclination of 0.145 ft/ft whereas the 40 percent hematite slurry composed of 100 percent minus 325 mesh slurry would not flow. At 0.05 percent dispersant the flow rate was significantly increased but drop-out occurred at flow rates lower than 22 gal/min. By adding organic polymer to this slurry the coarse particles were kept in suspension at much lower trough inclinations and drop-out did not occur until the flow rate dropped below 18 gal/min.

The fundamental problem of evaluation of the forces exerted on the individual slurry particles by the fluid, the relation of these forces to the actual particle behavior and the resultant energy losses has been considered in detail. Superimposed on these interactions is the influence of the dispersant. The data show that particle interaction is significantly descreased by dispersant so that viscosities are reduced and flow rates are greatly increased.

Some organic polymers in low concentration appear to suppress turbulence in water flowing at high rates. This property may be attributed to the viscoelasticity of the polymer. It is possible to visualize long chain molecules orienting themselves preferentially in the direction of flow and impeding lateral velocity fluctuations. The effect of the organic polymers was to increase the carrying capacity of the slurries for coarse particles.

In summary, the present invention provides a method for pipelining iron ore wherein the particle size of the iron ore need not be exceedingly fine. The present invention provides both for improving the viscosity characteristics of the slurry and preventing drop-out of larger particles from the slurry by utilizing an organic polymer. Although only specific embodiments of the present invention have been described in detail, the invention is not limited thereto but is meant to include all embodiments coming within the scope of the appended claims.

I claim:

1. A method of pipelining iron ore comprising forming an aqueous slurry of iron ore particles of from 20 to 45 percent by volume, from 0.02 to 0.4 percent by weight based on iron ore content of the slurry of an ionic dispersant to contact the iron ore particles to impart negative charges thereon and from 0.01 to 0.2 percent by weight based on water content of the slurry of a nonionic organic polymer to increase the carrying capacity of the slurry for coarse iron ore particles, moving said slurry through a pipeline and recovering the iron ore particles from the slurry at a downline location.

2. The method of claim 1 further characterized in that the organic polymer is high molecular weight water-soluble polyacrylamide in an amount of from 0.01 to 0.05 percent by weight based on water content of the slurry.

3. The method of claim 1 further characterized in that the organic polymer is guar gum in an amount of from 0.05 to 0.2 percent based on water content of the slurry.

4. The method of claim 1 further characterized in that all of the iron ore particles pass a 10 mesh screen, 95 percent of the particles pass a 65 mesh screen, 80 percent of the particles pass a 200 mesh screen and 70 percent of the particles pass a 325 mesh screen.

5. The method of claim 1 further characterized in that the dispersant is lignosulfonate in an amount of from 0.05 to 0.2 percent by weight based on iron ore content of the slurry.

6. The method of claim 2 further characterized in that the dispersant is lignosulfonate in an amount of from 0.05 to 0.2 percent by weight based on iron ore content of the slurry.

7. The method of claim 3 further characterized in that the dispersant is lignosulfonate in an amount of from 0.05 to 0.2 percent by weight based on iron ore content of the slurry.

8. The method of claim 1 further characterized in that the iron ore is hematite.

* * * * *